US012597705B2

(12) United States Patent
Towfiq et al.

(10) Patent No.: US 12,597,705 B2
(45) **Date of Patent: *Apr. 7, 2026**

(54) SPACE-WAVE PHASE-SHIFTING ARRAY

(71) Applicants: i5 Technologies, Inc., North Logan, UT (US); Utah State University, Logan, UT (US)

(72) Inventors: Asaduzzaman Towfiq, Logan, UT (US); Bedri A. Cetiner, North Logan, UT (US)

(73) Assignees: i5 Technologies, Inc., North Logan, UT (US); Utah State University, Logan, UT (US)

( * ) Notice: Subject to any disclaimer, the term of this patent is extended or adjusted under 35 U.S.C. 154(b) by 994 days.

This patent is subject to a terminal disclaimer.

(21) Appl. No.: 17/522,684

(22) Filed: Nov. 9, 2021

(65) Prior Publication Data

US 2023/0142988 A1 May 11, 2023

(51) Int. Cl.
*H01Q 3/34* (2006.01)
*H01Q 5/371* (2015.01)
(Continued)

(52) U.S. Cl.
CPC ............... *H01Q 3/34* (2013.01); *H01Q 5/371* (2015.01); *H01Q 21/065* (2013.01); *H01Q 21/24* (2013.01)

(58) Field of Classification Search
CPC ........ H01Q 3/34; H01Q 5/371; H01Q 21/065; H01Q 21/24; H01Q 21/0018; H01Q 3/46
See application file for complete search history.

(56) References Cited

U.S. PATENT DOCUMENTS

| | | | |
|---|---|---|---|
| RE43,699 | E | 10/2012 | Anderson et al. |
| 8,373,608 | B2 | 2/2013 | Drexler |

(Continued)

FOREIGN PATENT DOCUMENTS

| | | | |
|---|---|---|---|
| CN | 105467372 | B | 8/2019 |
| CN | 209232950 | U | 8/2019 |

(Continued)

OTHER PUBLICATIONS

Gardelli et al., “Array thinning by using antennas in fabry-perot cavity for gain enhancement,” IEEE Transactions on Antennas and Propagation, Jul. 2006, 54(7):1979-1990.

(Continued)

*Primary Examiner* — David E Lotter
(74) *Attorney, Agent, or Firm* — Fish & Richardson P.C.

(57) ABSTRACT

A reconfigurable antenna array includes a plurality of emitting antennas, a plurality of drive inputs corresponding to respective emitting antennas of the plurality of emitting antennas and configured to receive drive signals for the respective emitting antennas, a plurality of controllable components that are controllable to perform space-wave phase shifting on radiation emitted by the plurality of emitting antennas, and a plurality of control inputs corresponding to the plurality of controllable components, the plurality of control inputs arranged to receive control signals for the plurality of controllable components. Control circuitry has outputs coupled to the plurality of control inputs is configured to deliver the control signals to the plurality of controllable components to cause the plurality of controllable components to space-wave phase shift the radiation emitted by the plurality of emitting antennas, causing the reconfigurable antenna array to emit a beam having an intensity peak in a target direction.

18 Claims, 18 Drawing Sheets

(51) Int. Cl.
*H01Q 21/06* (2006.01)
*H01Q 21/24* (2006.01)

(56) References Cited

U.S. PATENT DOCUMENTS

| | | | | |
|---|---|---|---|---|
| 9,379,449 | B2 | 6/2016 | Cetiner et al. | |
| 9,466,885 | B1 | 10/2016 | Farmahini | |
| 9,673,960 | B2 | 6/2017 | Eltawil | |
| 9,748,645 | B2 | 8/2017 | Mohamadi et al. | |
| 9,831,551 | B2 | 11/2017 | Piazza | |
| 9,859,757 | B1 | 1/2018 | Leabman et al. | |
| 10,224,979 | B1 | 3/2019 | Hunter | |
| 10,277,382 | B2 | 4/2019 | Eltawil | |
| 10,490,903 | B2 | 11/2019 | Foo | |
| 10,798,715 | B2 * | 10/2020 | Sturkovich | H04B 7/0617 |
| 10,812,992 | B1 | 10/2020 | Tran et al. | |
| 11,088,447 | B2 | 8/2021 | Polehn et al. | |
| 11,158,939 | B2 | 10/2021 | Yilmaz et al. | |
| 11,217,888 | B2 * | 1/2022 | Towfiq | H01Q 3/2617 |
| 11,769,944 | B2 * | 9/2023 | Towfiq | H01Q 21/065<br>343/824 |
| 2007/0090998 | A1 | 4/2007 | Chang et al. | |
| 2009/0146895 | A1 | 6/2009 | Drexler | |
| 2013/0176177 | A1 | 7/2013 | Cetiner et al. | |
| 2015/0236408 | A1 | 8/2015 | Kona et al. | |
| 2015/0333413 | A1 | 11/2015 | Piazza | |
| 2015/0341157 | A1 | 11/2015 | Eltawil | |
| 2018/0131089 | A1 | 5/2018 | Yilmaz | |
| 2019/0305436 | A1 | 10/2019 | Legay et al. | |
| 2019/0334228 | A1 | 10/2019 | Haridas et al. | |
| 2021/0151877 | A1 * | 5/2021 | Towfiq | H01Q 3/2617 |
| 2022/0123465 | A1 | 4/2022 | Towfiq et al. | |
| 2024/0097326 | A1 | 3/2024 | Towfiq et al. | |

FOREIGN PATENT DOCUMENTS

| | | | |
|---|---|---|---|
| WO | WO 2015/178979 | A2 | 11/2015 |
| WO | WO 2017150054 | A1 | 9/2017 |

OTHER PUBLICATIONS

Li et al., "A new class of antenna array with reconfigurable element factor," IEEE Transactions on Antennas and Propagation, Apr. 2013, 61(4):1947-1955.

* cited by examiner

1600

SPACE-WAVE PHASE-SHIFTING ARRAY

STATEMENT OF FEDERALLY SPONSORED RESEARCH

This invention was made with government support under NSF award #1758543 awarded by the National Science Foundation. The government has certain rights in this invention.

FIELD OF THE DISCLOSURE

The present disclosure relates to phased arrays for directional signal generation.

BACKGROUND

Phased arrays are used to steer beams of electromagnetic radiation, such as in 5G networks, through constructive and destructive interference of electromagnetic waves. The high cost and high power consumption associated with some phased arrays can make them cost-prohibitive to include in consumer and other devices.

SUMMARY

In one aspect, this disclosure describes apparatuses. For example, this disclosure describes an apparatus including a reconfigurable antenna array. The reconfigurable antenna array includes a plurality of emitting antennas; a plurality of drive inputs corresponding to respective emitting antennas of the plurality of emitting antennas and configured to receive drive signals for the respective emitting antennas; a plurality of controllable components that are controllable to perform space-wave phase shifting on radiation emitted by the plurality of emitting antennas; and a plurality of control inputs corresponding to the plurality of controllable components, the plurality of control inputs arranged to receive control signals for the plurality of controllable components. The apparatus includes control circuitry having outputs coupled to the plurality of drive inputs and the plurality of control inputs. The control circuitry is configured to drive the plurality of emitting antennas to generate the radiation, and is configured to deliver the control signals to the plurality of controllable components to cause the plurality of controllable components to space-wave phase shift the radiation emitted by the plurality of emitting antennas. The space-wave phase shifting by the plurality of controllable components causes the reconfigurable antenna array to emit a beam having an intensity peak in a target direction.

In various implementations, this and other apparatuses within the scope of this disclosure can have any one or more of at least the following characteristics.

In some implementations, the control circuitry is configured to deliver the control signals to the plurality of controllable components to steer the beam between at least ten target directions.

In some implementations, at least two of the at least ten target directions are less than two degrees apart from one another.

In some implementations, at least one antenna of the plurality of emitting antennas is not coupled to a guided-wave phase shifter.

In some implementations, radiation emitted by at least one antenna of the plurality of emitting antennas is not space-wave phased shifted by the plurality of controllable components.

In some implementations, a first controllable component of the plurality of controllable components includes an adjustable coupling device.

In some implementations, the adjustable coupling device includes a varactor.

In some implementations, the control circuitry is configured to adjust the adjustable coupling device between at least five different settings.

In some implementations, each setting of the at least five different settings corresponds to a different respective impedance of the adjustable coupling device.

In some implementations, the adjustable coupling device is continuously adjustable.

In some implementations, the adjustable coupling device couples two portions of metal in the first controllable component.

In some implementations, the plurality of controllable components have controllable impedances.

In some implementations, the radiation emitted by the plurality of emitting antennas, prior to space-wave phase shifting, has a common phase across the plurality of emitting antennas.

In some implementations, a first controllable component of the plurality of controllable components includes an array of metal portions in which nearest-neighbors are coupled by adjustable coupling devices.

In some implementations, the apparatus includes a superstrate spaced apart from a substrate on which or in which the plurality of controllable components are disposed, the superstrate including a partially reflective surface.

In some implementations, the plurality of controllable components are arranged in a first common plane spaced apart from a second common plane in which the plurality of emitting antennas are arranged.

In some implementations, the first common plane and the second common plane are separated by at least one of air or a substrate material.

In some implementations, a first controllable component of the plurality of controllable components includes a first portion configured to phase shift vertically-polarized electromagnetic waves, and a second portion arranged orthogonally to the first portion and configured to phase shift horizontally-polarized electromagnetic waves.

In another, related aspect, this disclosure describes methods. For example, this disclosure describes a method in which a plurality of emitting antennas included in a reconfigurable antenna array are driven to emit radiation. A plurality of controllable components are controlled to cause the plurality of controllable components to space-wave phase shift the radiation emitted by the plurality of emitting antennas. The space-wave phase shifting by the plurality of controllable components causes the beam to have an intensity peak in a target direction.

In various implementations, this and other methods within the scope of this disclosure can have any one or more of at least the following characteristics.

In some implementations, the method includes causing the plurality of controllable components to steer the beam between at least ten target directions.

In some implementations, at least two of the at least ten target directions are less than two degrees apart from one another.

In some implementations, controlling the plurality of controllable components includes adjusting an adjustable coupling device of a first controllable component of the plurality of controllable components.

In some implementations, the adjustable coupling device includes a varactor.

In some implementations, adjusting the adjustable coupling device includes adjusting the adjustable coupling device between at least five different settings.

In some implementations, each setting of the at least five different settings corresponds to a different respective impedance of the adjustable coupling device.

In some implementations, the radiation emitted by the plurality of emitting antennas, prior to space-wave phase shifting, has a common phase across the plurality of emitting antennas.

In some implementations, a first controllable component of the plurality of controllable components includes an array of metal portions in which nearest-neighbors are coupled by adjustable coupling devices.

In some implementations, driving the plurality of emitting antennas includes driving a first emitting antenna of the plurality of emitting antennas to emit radiation having two components of two respective perpendicular polarizations. Controlling the plurality of controllable components includes controlling a first controllable component of the plurality of controllable components to phase shift the two components with two different phase shift values.

Implementations according to this disclosure can help to realize one or more advantages. In some implementations, power consumption can be reduced by using space-wave phase shifting as a primary phase shifting mechanism instead of guided-wave phase shifting. In some implementations, cost, device size, and system complexity can be reduced by reducing a need for complex guided-wave phase shifters. In some implementations, beams can be steered over many different angles with small step sizes through space-wave phase shifting. In some implementations, adjustable coupling devices can be adjusted quasi-continuously for fine beam control, which can improve gain. In some implementations, the use of varactors can provide improved steering precision/gain, device lifetime, and/or adjustable impedance range.

The details of one or more implementations are set forth in the accompanying drawings and the description below. Other aspects, features and advantages will be apparent from the description and drawings, and from the claims.

DETAILED DESCRIPTION

This disclosure relates to reconfigurable phased arrays. The phased arrays incorporate controllable components that perform space-wave phase shifting in order to steer emitted beams of radiation. Performing the beam-steering using space-wave phase shifting can provide improved beam gain (e.g., efficiency and/or directivity) and simpler phased array design, reducing cost and power consumption.

Figure 1:
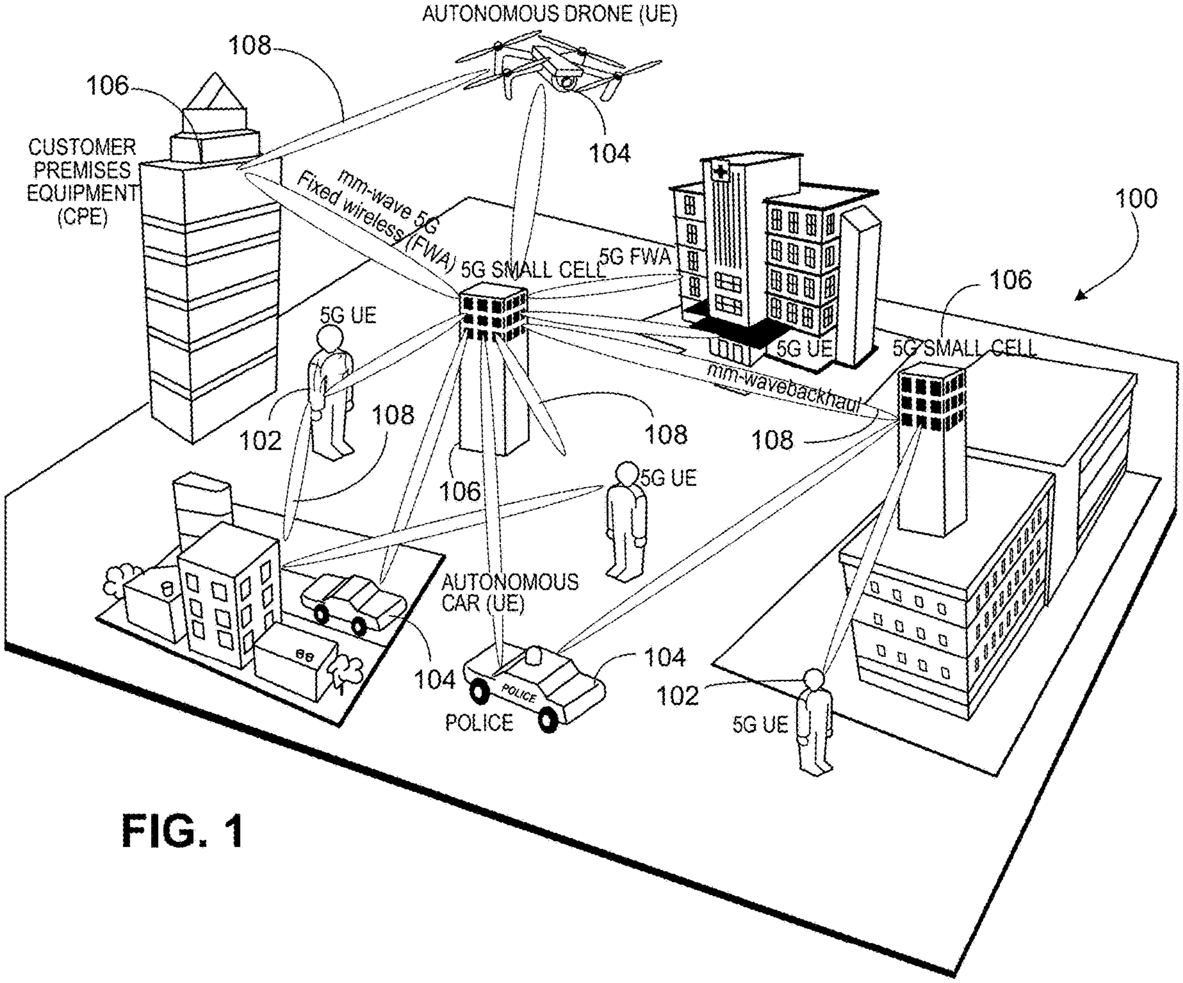
FIG. 1 is a diagram illustrating an example environment deploying a 5G wireless communication system.

In some mm-wave 5G systems, base stations dynamically steer phased array beams toward intended users to provide improved best data rates and to reduce interference for other users, and/or user devices steer their own phased array beams towards base stations. FIG. 1 shows beam-steering in an example mm-wave 5G system 100. In such a system, devices 102 of users (e.g., phones, wearable devices, and other personal devices — generally referred to as user equipment (UE)), vehicle-borne devices 104 of vehicles (e.g., antennas of drones and automobiles), and base station antennas and backhaul network components 106 (e.g., in small cells, towers, buildings, and/or infrastructure components) exchange steered radiation beams 108 with one another to send and receive data.

While some beam-steering antennas, such as base station antennas and backhaul network components 106, are connected to steady sources of electricity, other beam-steering antennas, such as antennas in the devices 102 carried by users, are likely to be battery-powered. Power consumption is an important parameter guiding processor, software, and transceiver designs in battery-powered devices such as phones, and, therefore, widespread adoption of beam-steering in these devices may depend on reducing the power consumption of beam-steering antennas.

Power consumption in beam-steering antennas (phased arrays) is typically associated in large part with phase shifters of the beam-steering antennas. Phase shifters disposed in communication with transmission lines feeding antennas receive signals from a signal source, adjust phases of the signals, and send the phase-adjusted signals to one or more of the antennas, which transmit the phase-adjusted signals. This can be referred to as "guided-wave" phase shifting, because phase-adjusted waves travel along the transmission lines as guided energy. Typically, multiple phase shifters perform respective phase shifting operations on respective signals, and the phase shifting is performed such that the phase-adjusted signals, when transmitted by the antennas, superpose with one another to form a plane-wave or near-plane-wave with an intensity peak in a target direction. However, guided-wave phase shifters exhibit relatively high power consumption (e.g., DC power consumption), reducing their usefulness in mobile and other power-constrained applications. Moreover, guided-wave phase shifters are exposed to high AC power (e.g., RF power in RF transmission applications), which may cause significant loss (e.g., RF loss). Also, the inclusion of guided-wave phase shifters can add significant cost to phased array systems.

By contrast, according to at least some implementations of this disclosure, space-wave phase shifting is used to phase-adjust already-transmitted radiation, imparting a dominant intensity peak to the radiation. "Space-wave phase shifting" refers to phase shifting performed on already-emitted radiation through interaction (e.g., coupling and re-radiation) with active or passive phase shifting components. Using the technologies described in this disclosure, beam-steering can be achieved without any guided-wave phase shifting (or at least with less guided-wave phase shifting as compared with systems with phase-shifters disposed in communication with transmission lines), such that power consumption, cost, and/or loss can be reduced. Space-wave phase shifting can also save circuit real estate/footprint compared to guided-wave phase shifting, because the significant circuit space devoted to guided-wave phase shifters and associated transceiver chains can be reduced or eliminated. Also, the highly flexible reconfigurability afforded by the technologies described in this disclosure can improve antenna system gain and/or directivity across a range of emission angles.

Figure 2:
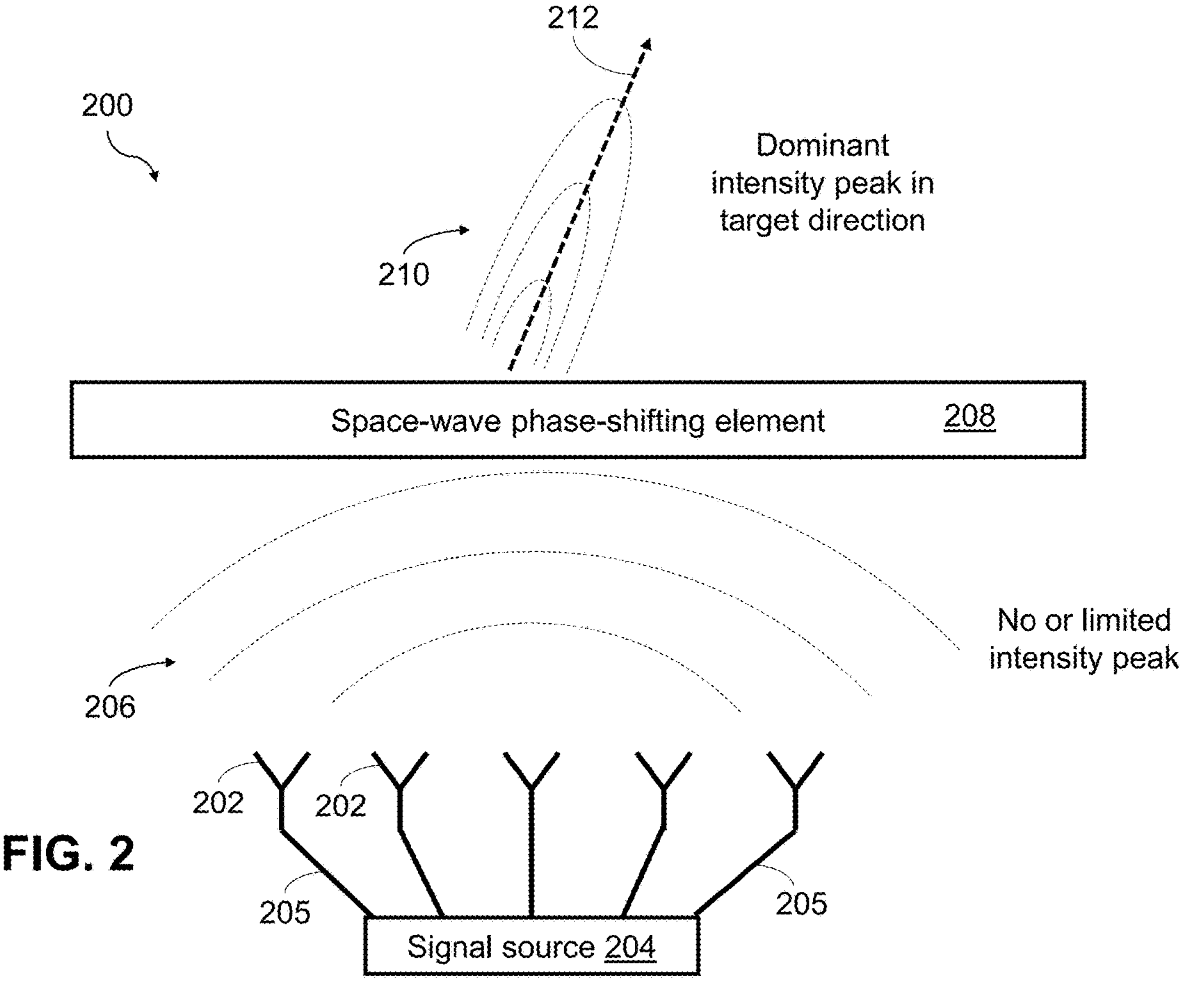
FIG. 2 is a diagram illustrating an example reconfigurable antenna system.

As shown in FIG. 2, a reconfigurable antenna system 200 includes an array of antennas 202 arranged to receive signals from a signal source 204 over transmission lines 205 and to transmit collective radiation 206. The radiation 206 need not have (but can have) an intensity peak in any target direction but, rather, in some implementations is non-directional. For example, in some implementations there is no relative phase between signals transmitted from the signal source 204 to each antenna 202, such that the radiation emitted individually from each antenna 202 has the same or substantially the same phase (e.g., except for any phase differences caused by different transmission line 205 lengths to each antenna 202).

The radiation 206 interacts with a space-wave phase-shifting element 208, examples of which are described in more detail below. The space-wave phase-shifting element 208 performs space-wave shifting on the radiation 206 that causes phase-shifted radiation 210 (e.g., the radiation 206 after phase-shifting by the space-wave phase-shifting element 208) to have an intensity peak in a target direction 212. For example, the target direction 212 can correspond to a direction of a receiving device (e.g., a base station or mobile device) with respect to the reconfigurable antenna system 200. Because some or all of the duties of guided-wave phase shifters have been transferred to the space-wave phase-shifting element 208, the advantages described above and throughout this disclosure (e.g., reduction in power consumption, cost, size and/or loss, and an increase in gain) can be achieved.

Figure 3:
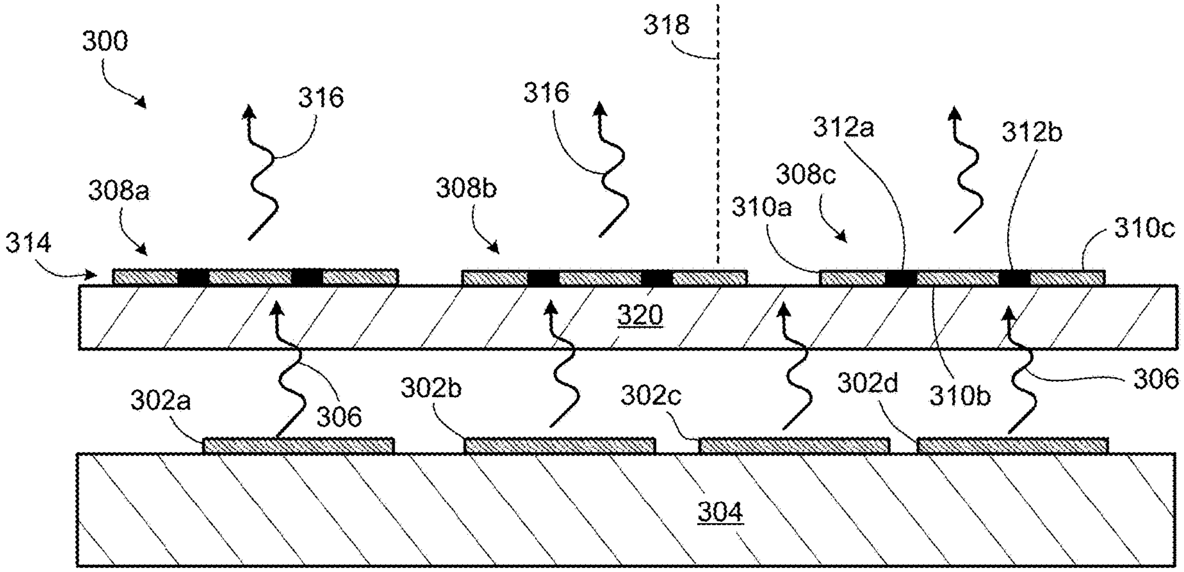
FIG. 3 is a diagram illustrating antennas and controllable components in an example reconfigurable antenna system.

FIG. 3 shows an example reconfigurable antenna system 300, such as the reconfigurable antenna system 200. Multiple antennas 302*a*, 302*b*, 302*c*, 302*d* are disposed on or in a first substrate 304. For example, the antennas 302 can be formed lithographically on/in the first substrate 304, or the antennas 302 can be formed external to the first substrate 304 and subsequently transferred to the first substrate 304, e.g., in a pick-and-place process. The first substrate 304 can be formed of various materials depending on the implementation. For example, the first substrate 304 can be a silicon substrate, a printed circuit board (PCB), a dielectric substrate such as a glass substrate, a flexible substrate, e.g., formed of a flexible plastic or other polymer, and/or a combination of these substrate types. The antennas 302 are driven to emit radiation 306.

In this example, the space-wave phase-shifting element includes multiple controllable components 308*a*, 308*b*, 308*c* that at least partially make up a space-wave phase-shifting element, e.g., space-wave phase-shifting element 208. In some implementations, as shown in FIG. 3, each controllable component 308 includes multiple portions of metal (e.g., pads, strips, films, and/or other distinct sections, such as portions of metal 310*a*, 310*b*, 310*c*) coupled by adjustable coupling devices (e.g., coupling devices 312*a*, 312*b*). The coupling devices are controllable (e.g., by electrical and/or optical signals) to adjust electromagnetic parameters of the controllable components 308 (e.g., of the combined portions of metal-coupling devices electromagnetic systems). For example, in some implementations the adjustable coupling devices are varactor diodes (also referred to herein simply as varactors). The controllable components interact with the radiation 306, phase-shifting it to produce radiation 316 which has an intensity peak in a target direction due to constructive/destructive interference between radiation 316 from different controllable components 308.

As shown in FIG. 3, in some implementations the controllable components 308 are provided in a plane 314 that is arranged above a plane of the antennas 302 (e.g., the plane of the first substrate 304). For example, the controllable components 308 can be provided on or in a second substrate (e.g., substrate 320) that is spaced apart from (e.g., with air and/or another material in between) or placed in contact with the first substrate 304, or the controllable components 308 can be integrated into a higher layer of the same first substrate 304, as described in further detail in reference to FIGS. 9-10.

Figure 4:
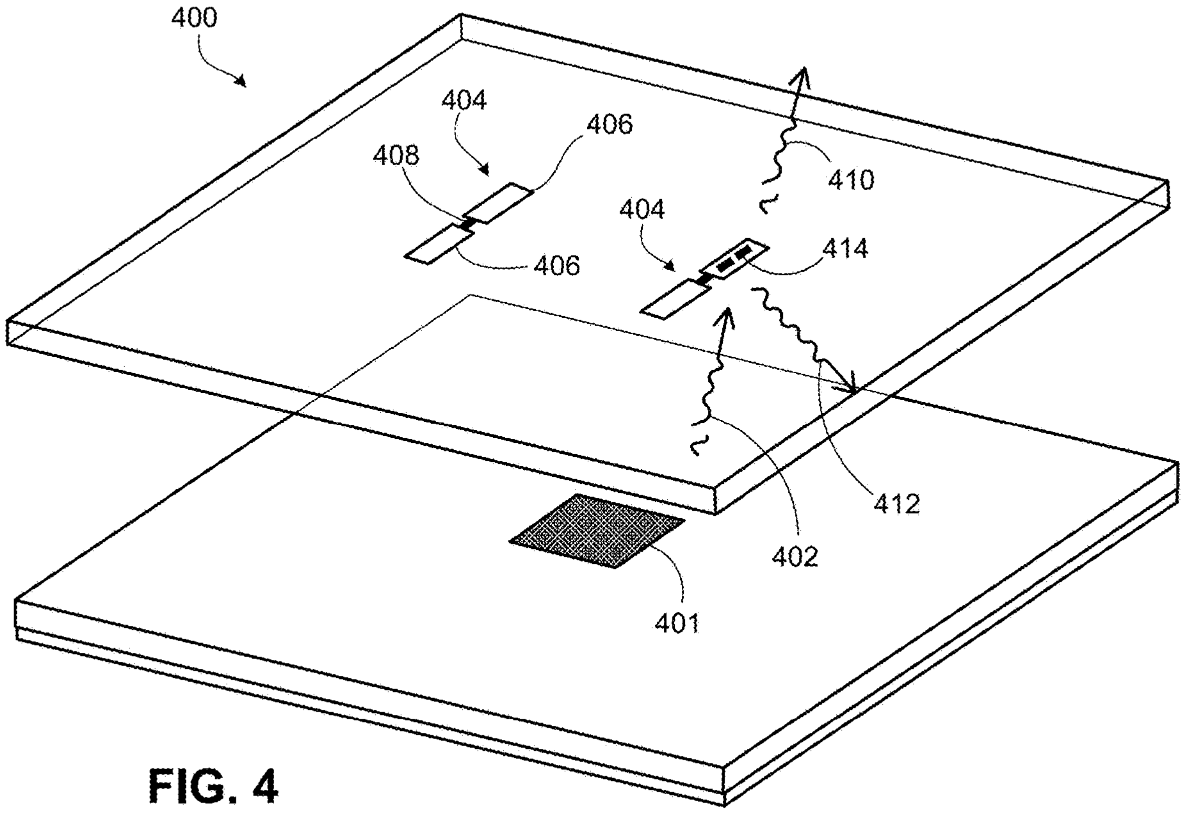
FIG. 4 is a diagram illustrating antennas and controllable components in an example reconfigurable antenna system.

Physically, the operation of each controllable component can be understood in reference to FIG. 4, which shows a reconfigurable antenna system 400 similar to antenna systems 200, 300. An antenna 401 is driven to emit incident electromagnetic radiation 402 having a first amplitude $\alpha_1$ and phase $\phi_1$. The incident radiation 402 interacts with a controllable component 404 that includes two metal films 406 coupled by a varactor 408, which is controllable by control inputs not shown in FIG. 4. In some implementations, the controllable components 404 can be substantially similar to the controllable components 308 described with reference to FIG. 3. Continuing the reference to FIG. 4, the incident radiation 402 couples electromagnetically with the controllable component 404 and induces an RF current 414 $I=I_r+jI_i$ in the controllable component 404, where $I_r$ and $I_i$ are orthogonal components of the current (e.g., real and imaginary, respectively). The values of $I_r$ and $I_i$ depend on the complex impedance of the controllable component 404, which in turns depends on the capacitance of the varactor 408. Put differently, as the capacitance of the varactor 408 changes, so does the effective electrical "length" of the controllable component 404.

The controllable component 404 reradiates output electromagnetic radiation 410, which has amplitude $\alpha_2$ and phase $\phi_2$, where $\varphi_2=\varphi_1+\delta\varphi$, the phase difference $\delta\varphi$ being provided by the controllable component 404 and depending at least on $I_i$. In addition, some portion of the incident radiation 402 is reflected as reflected electromagnetic radiation 412 having amplitude $\alpha_3$ and phase $\varphi_3$. The controllable component 404 can be configured so that the amplitude a3 of the reflected radiation 412 is much less than the amplitude $\alpha_2$ of the output radiation 410, i.e., so that $\alpha_2 \gg \alpha_3$. Configuration of the controllable component 404 to satisfy this condition can be based on controllable component geometry, controllable component geometry, and/or voltages applied to elements (e.g., varactors) of the controllable components.

In some implementations, the controllable component 404 is placed in a near-field vicinity of the antenna 401, e.g., within less than half a wavelength λ of the incident radiation 402, within less than λ, within less than 2λ, within less than 3λ, or within less than 5λ. In some implementations, the near-field vicinity is within a distance $2D^2/\lambda$, where D is a largest dimension of the array of antennas or a largest dimension of a single antenna. Because of this close proximity, relatively little high-frequency power (e.g., RF power) couples lossily between the antenna 401 and the controllable component 404, reducing power loss. In implementations of the controllable components that include varactors, the varactors also exhibit low power dissipation, further reducing power loss. This is in contrast to primarily guided-wave phase-shifting systems, in which significant power loss can occur (i) in guided-wave phase shifters (e.g., dissipated in components of the guided-wave phase shifters) and (ii) in high-frequency connections between guided-wave phase shifters and transmission lines.

In the aggregate, phase shifting performed by multiple controllable space-wave phase-shifters, such as the controllable component 404, can be configured to steer an entire beam over an entire aperture (or at least a significant portion thereof) of a reconfigurable antenna system. For example, referring back to FIG. 3, controllable component 308*a* can be configured (e.g., by adjustment of a varactor of the controllable component 308*a*) to cause a phase shift $\delta\varphi$; controllable component 308*b* can be configured to cause a phase shift $2\delta\varphi$; and controllable component 308*c* can be configured to cause a phase shift $3\delta\varphi$, where the value of $\delta\varphi$ can be dependent on, among other possible factors, a wavelength of radiation being emitted by the antennas 302, a spacing between the controllable components 308, and/or optical parameters of the reconfigurable antenna system 300, such as indexes of refraction of the first substrate 304 and, where applicable, a second substrate on or in which the controllable components 308 are disposed. In the simplest case, a one-dimensional array of controllable components 308 with inter-component spacing d is excited by antennas 302 emitting radiation of a common phase and wavelength λ. To steer a beam at an angle θ with respect to a normal direction 318 to the array of controllable components 308, the controllable components 308 should be configured such that $\delta\varphi$, the difference in phase-shift from one controllable component 308 to another in succession in the array, is $\delta\varphi=2\pi\cdot d\cdot\sin(\theta)/\lambda$. For example, voltages should be applied to varactors of the controllable components 308 such that varactors of the controllable components have capacitances that cause $\delta\varphi$ to be $2\pi\cdot d\cdot\sin(\theta)/\lambda$. Note that in some implementations the emitted radiation is in the radio band, but other electromagnetic bands can instead be used.

In practice, controllable components need not be disposed in an evenly-spaced one-dimensional array. Rather, in some implementations controllable components are spaced unevenly with respect to one another, can be clustered in groups spaced apart from one another, and/or can be provided in two-dimensional arrays for beam-steering over a solid angle as opposed to only in a plane. And controllable components need not be (but can be, in some implementations) provided in a one-to-one ratio with corresponding antennas. Rather, in some implementations a given controllable component couples with radiation from multiple antennas, and/or a given antenna emits radiation that couples to, and is phase-shifted by, multiple controllable components. For example, in FIG. 3, controllable component 308*b* can couple to radiation from two antennas 302*b*, 302*c*, and, in FIG. 4, both controllable components 404 can couple to radiation from antenna 401. This flexibility in placement can provide advantages by, for example, reducing cost and/or power consumption by reducing a number of controllable components that must be included in a reconfigurable antenna system, and/or can improve performance by allowing elements of the reconfigurable antenna system to be placed for optimized beam steering in particular directions. For any given arrangement and configuration of antennas and controllable components, a computational electromagnetic solver can be used to derive a relationship between each configurable component's phase shift and a resulting intensity of an output radiation beam as a function of output angle.

For example, in some implementations, calculations are performed ahead of time to determine, for each possible output angle, a corresponding set of configurations of controllable components that causes an output beam to be steered at that angle. For example, an optimization algorithm (e.g., a genetic algorithm, pattern searching, a quasi-Newton method, simulated annealing, and/or another method) is applied to results of a computational electromagnetic solver (e.g., HFSS or CST), where adjustable parameters during the optimization process include voltages applied to varactors in controllable components of a reconfigurable antenna array. In some implementations, the optimization process, instead of or in addition to varying the individual voltages applied to varactors, treats at least some controllable components as "black boxes" able to impart adjustable phase shifts, and the phase shifts themselves are the parameters adjusted during the optimization process. An output of optimization can be a data structure (e.g., a table, a database, a function, or another data structure) that associates output angles with corresponding sets of configurations of the controllable components to steer a beam at that angle, e.g., a list of voltages to be applied to varactors. The data structure is stored (e.g., on FPGA 600 or a storage device coupled to FPGA 600) and is consulted during operation to identify appropriate settings of the configurable components.

At a physical level, as noted above, the phase shift imparted by any individual controllable component depends on the controllable component's impedance. For example, in the case of a controllable component in which the one or more adjustable coupling devices include one or more varactors, the impedance of the controllable component depends on the respective capacitances of the varactors. A varactor is a voltage-dependent capacitor that exploits the voltage-dependent capacitance of a reverse-biased p-n junction. As the reverse voltage over the p-n junction is varied, the width of the depletion region between p-type and n-type semiconductors (or, in general, between two materials with different work functions) also varies, changing the junction's capacitance. Various varactor types are within the scope of this disclosure and can be classified according to their doping profiles, for example, abrupt and hyperabrupt doping profiles, and/or according to their materials and/or devices structures, such as silicon varactors, gallium arsenide varactors, and heterostructure barrier varactors that include multiple material types. For controllable components that include multiple varactors, an overall complex impedance of the controllable component is a combination (e.g., a series and/or parallel combination) of impedances of the multiple varactors, and can also depend on, for example, geometries (e.g., shapes, widths/lengths, and/or thicknesses) of the metal portions, and/or on a number of the metal portions. In some implementations, the varactors are fabricated together with the portions of metal of the controllable components, such as in lithographic steps performed using a substrate on and/or in which the controllable components are provided.

Although the adjustable coupling devices need not be varactors, varactors can provide various advantages. For example, varactors draw essentially no DC current when reverse-biased, limiting power consumption. In some implementations, varactors can be switched many times without degrading, improving device lifetime. In some implementations, varactors can be switched with little or no hysteresis, improving phase-shifting precision and therefore steering precision and/or gain. In some implementations, varactors can be switched over wider impedance ranges than other variable-impedance devices.

Because varactors are operated in a reverse-biased state, essentially no DC current passes through the varactor during operation, limiting power consumption by the varactor. By contrast, a typical integrated circuit-implemented guided-wave phase-shifter exhibits DC current dissipation. This and other power consuming factors generally inherent in guided-wave phase-shifting (e.g., guided-wave phase-shifting as part of an RF transceiver chain) mean that the space-wave phase-shifting described in this disclosure can reduce power by up to ten times, or more, compared to equivalent guided-wave phase-shifting systems.

Figure 5A:
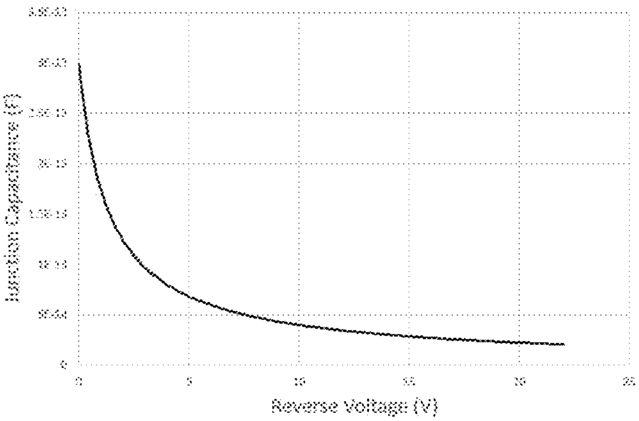
FIG. 5A is a plot illustrating simulated varactor capacitance as a function of applied reverse voltage.
Figure 5B:
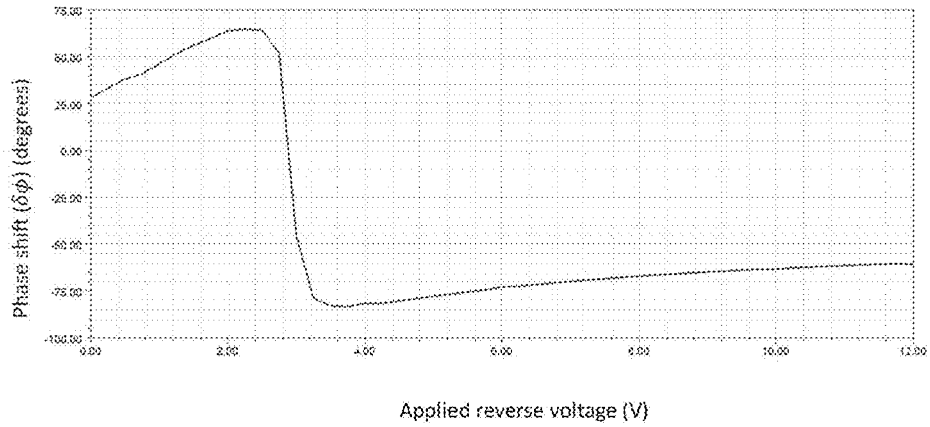
FIG. 5B is a plot illustrating simulated phase shift from a controllable component based reverse voltage applied to a varactor in the controllable component.

As shown in FIG. 5A, the junction capacitance of a varactor is continuously controllable based on the reverse voltage applied over the varactor. As shown in FIG. 5B, for an example controllable component that includes the varactor, this results in a corresponding voltage-dependent phase shift imparted by the controllable component. By precise control of the applied voltage over a range of about 2.5 V to 3.5 V, the phase shift in this example can be varied continuously from 65° to −80°. In various implementations, e.g., by control of multiple voltages over multiple varactors in a controllable component, the aggregate phase shift can be varied over wider ranges, such as from 90° to −90° or from 180° to −180°.

Because the varactor is a continuously-adjustable element, in some implementations the phase-shifting resolution of controllable components incorporating varactors is limited by the resolution of control circuitry (is "quasi-continuous"), e.g., a resolution of well-controlled voltages that can be applied to the varactors. For example, in some implementations, control circuitry configured to control one or more varactors in a controllable component at a resolution of 0.1 V will result in a controllable component with lower phase-shifting resolution, and/or a lower number of discrete phase-shifting values that can be switched between, than control circuitry configured to control the varactors at a resolution of 0.05 V. In various implementations, a combination of (i) a controllable component incorporating one or more adjustable coupling devices as described in this disclosure, such as one or more varactors, and (ii) control circuitry configured to control the controllable component by controlling the one or more adjustable coupling devices (e.g., independently), can be configured such that that the space-wave phase-shifting of the controllable component is switchable between at least three different values with a resolution (step size) of 0.1° or less, 0.5° or less, 1° or less, 2° or less, 3° or less, 5° or less, or 10° or less, or a value between any two of these step sizes. In various implementations, the combination of the controllable component and the control circuitry is configured such that the space-wave phase-shifting of the controllable component is switchable between at least three different values, at least five different values, at least ten different values, at least twenty different values, at least fifty different values, or at least one hundred different values. In some implementations, these values are separated from one another by at least one of these step sizes and/or by less than one of these step sizes. In various implementations, the number of different values is less than two hundred, less than five hundred, or less than one thousand. In various implementations, the phase shift imparted by a controllable component controlled as described in this disclosure can be up to between 20° and 180° or 360°, up to between 30 and 180° or 360°, up to between 60 and 180° or 360°, up to between 90° and 180° or 360°, up to between 135° and 180°, or up to between 180° and 360°, where "up to" refers to a range that can be from 0° to the value.

In some implementations, an adjustable coupling device and control circuitry are jointly configured so that the control circuitry can adjust the adjustable coupling device over more than two values/settings, such as at least three different settings, at least five different settings, at least ten different settings, at least twenty different setting, at least fifty different settings, or at least one hundred different settings. In some implementations, each setting corresponds to a different impedance of the adjustable coupling device. In various implementations, the number of different settings is less than two hundred, less than five hundred, or less than one thousand.

The quasi-continuous adjustability provided by the adjustable coupling devices described in this disclosure (e.g., continuous adjustability of the adjustable coupling device itself, limited by stability and precision of control signals/voltages that set each configuration), such as voltage-switchable varactors, provides not merely quantitative benefits over alternative coupling devices that may, for example, be switchable between only two, three, or other limited number of states (and/or that may be controlled by control circuitry that is configured to switch the devices between only two, three, or other such limited number of states). Rather, the combination of devices and control systems described in this disclosure allows for a different type of beam-steering, in which the primary phase-shifting that causes an output beam to have an intensity peak in a target direction is provided by space-wave phase-shifting rather than by guided-wave phase-shifting. Less capable alternative space-wave phase-shifting controllable components and circuitry (e.g., controllable components and circuitry together configured to switch with larger step sizes and/or fewer step counts) can, in some cases, provide useful effects, such as improving beam gain, reducing beam sidelobes, or aiding in switching beam direction between at most several alternatives. But, when using these alternative components and circuitry, these space-wave effects are secondary compared to the guided-wave phase-shifting that is also present and that is used to cause a beam intensity peak in a target direction. By contrast, an array of controllable components, and corresponding circuitry, as described throughout this disclosure, can itself cause a beam intensity peak in a target direction, and can, in some implementations, be adjusted more granularly and in more varied configurations.

In some implementations, systems according to this disclosure do not include guided-wave phase-shifters coupled to antennas. In some implementations according to this disclosure, at least one antenna is not coupled to a guided-wave phase-shifter. In some implementations, in a system of n antennas, fewer than n guided-wave phase-shifters are present. In some implementations, in a system of n antennas, drive signals to fewer than n antennas or fewer than n−1 antennas are guided-wave phase-shifted. Implementations according to this disclosure can include guided-wave phase shifters (e.g., guided-wave phase shifters coupled to antennas to phase-shift respective signals provided to the antennas), but, in at least some implementations, primary beam-steering functionality is provided through space-wave phase shifting.

In addition, the controllable components and corresponding circuitry described in this disclosure need not be arranged in a one-to-one relationship with emitting antennas but, rather, can be arranged in other combinations and patterns. The controllable components can therefore be referred to collectively as a space-wave phase-shifting element 108 as shown in FIG. 2, wherein the space-wave phase-shifting element 108 can be configured to steer a beam over a wide angular range through space-wave phase shifting. For example, for an example array of ten controllable components, each switchable between ten states, the space-wave phase-shifting element is switchable between $10^{10}$ different states, providing enormous beam-steering flexibility. This high number of possible states can also lead to improved antenna gain and steering resolution, because phases can be shifted to their exactly or near-exactly optimal values through quasi-continuous adjustment of adjustable coupling devices.

In some implementations, the beam-steering devices include controllable devices and control circuitry configured to, by space-wave phase-shifting, steer beams with high resolution (low step size), e.g., step sizes of 0.1° or less, 0.5° or less, 1° or less, 2° or less, 3° or less, 5° or less, or 10° or less, or a value between any two of these step sizes. In some implementations, the beam can be steered between at least three different angles, at least five different angles, at least ten different angles, at least twenty different angles, at least fifty different angles, or at least one hundred different angles. In some implementations, these angles are separated from one another by at least one of these step sizes and/or by less than one of these step sizes. In various implementations, the number of different angles is less than two hundred, less than five hundred, or less than one thousand. In various implementations a space-wave phase-shifting element including controllable components controlled as described in this disclosure can steer beams over ranges of up to between 20° and 180° or 360°, up to between 30 and 180° or 360°, up to between 60 and 180° or 360°, up to between 90° and 180° or 360°, up to between 135° and 180°, or up to between 180° and 360°, where "up to" refers to a range that can be from 0° to the value.

Figure 6:
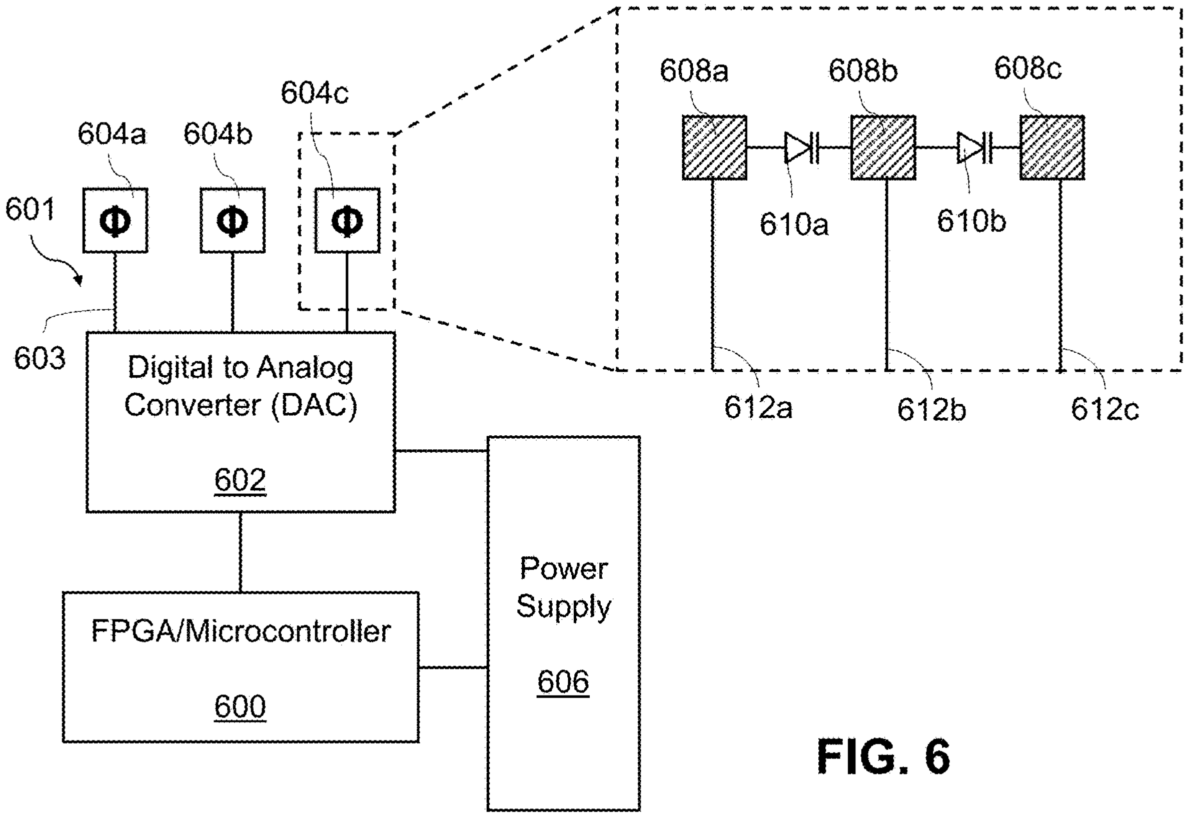
FIG. 6 is a diagram illustrating example control circuitry.

Various mechanisms can be used to control the controllable components. In some implementations, as shown in FIG. 6, control circuitry 601 includes a field programmable gate array (FPGA) and/or microcontroller 600 that is coupled (e.g., electrically coupled) to a digital-to-analog converter (DAC) 602, which in turn is coupled (e.g., electrically coupled) to controllable components 604. Note that these couplings (e.g., coupling 603) are shown schematically and can, in some implementations, represent multiple physical control lines, such as the control lines 612 described below. In some implementations, the FPGA 600 is coupled to one or more other computer system components, such as a storage and/or memory, networking and/or interfacing components, and/or other component components, as described for computer systems below. The FPGA 600 uses an algorithm or other decision-making process (e.g., an algorithm stored in a storage device or memory coupled to the FPGA 600) to determine appropriate signals to provide to the DAC 602. For example, the algorithm can map target angles for beam-steering to sets of voltages to be applied to the one or more adjustable coupling devices of each controllable component 604 in order to steer beams to the target angles. In some implementations, an algorithm instead or additionally maps target phase shifts provided by controllable components to sets of voltages that produce those phase shifts, and then that or another algorithm can map the target angles to particular combinations of phase shifts for a given arrangement of controllable components and/or antennas. The FPGA 600 then provides corresponding control signals (e.g., streams of bits) to the DAC 602 to cause the DAC 602 to apply the selected sets of voltages to the controllable components 604. The control circuitry 601 is configured to provide control signals/voltages that cause the output beam to have an amplitude peak in the target direction based on space-wave phase-shifting caused by the control signals/voltages. The FPGA 600 and the DAC 602 are powered by a power supply 606, e.g., a battery or a steady power supply.

The control circuitry 601 is merely an example. In various implementations, additional or alternative computer systems and arrangements of control devices can be used to control the controllable components in accordance with this disclosure.

As also shown in FIG. 6, a controllable component 604c can include multiple portions of metal 608*a*, 608*b*, 608*c* that are coupled pairwise via adjustable coupling devices 610*a*, 610*b* (in this example, varactors). In various implementations, there can be two, three, four, or more than four portions of metal, and the portions of metal need not be coupled only in a strip as in the example of FIG. 6 but, rather, can be arranged in other patterns and configurations without departing from the scope of this disclosure. For example, other implementations can include an additional portion of metal coupled by an additional varactor to the portion of metal 608*b*. In addition (e.g., as described in reference to FIG. 7), in some implementations a single controllable component includes two or more sets of metal portions that are not linked to one another by adjustable coupling devices. In some implementations, the varactors in a controllable component are arranged such that they have aligned polarities. For example, the cathode of varactor 610*a* is coupled (via portion of metal 608*b*) to the anode of varactor 610*b*, such that a sequence of increasing applied voltages from control line 612*a* to control line 612*b* to control line 612*c* results in both varactors 610 being revise-biased. This can simplify control of the controllable component 604.

Control lines 612*a*, 612*b*, 612*c* are coupled to the portions of metal 608*a*, 608*b*, 608*c* to control the varactors 610. In particular, a voltage applied between control lines 612*a* and 612*b* controls a first capacitance of varactor 610*a*, and a voltage applied between control lines 612*b* and 612*c* controls a second capacitance of varactor 610*b*. The first and second capacitances can be adjusted independently to obtain a target phase shift provided by the controllable component 604. Some or all of the controllable components 604 are controlled in this manner such that they together behave as an aggregate space-wave phase-shifting element that causes a dominant intensity peak in a target direction, such as space-wave phase-shifting element 208.

Other arrangements or configurations of control lines 612 are also within the scope of this disclosure. For example, in some implementations at least some control lines do not couple to controllable components via the metal portions of the controllable components but, rather, couple to adjustable coupling devices by connections at other locations, e.g., at the adjustable coupling devices themselves. In addition, other circuit devices can also be present, such as a tuned circuit (e.g., including a blocking capacitor) electrically coupled to the adjustable coupling devices. The other circuit devices can aid in stably controlling the impedance of the adjustable coupling device.

Figure 7:
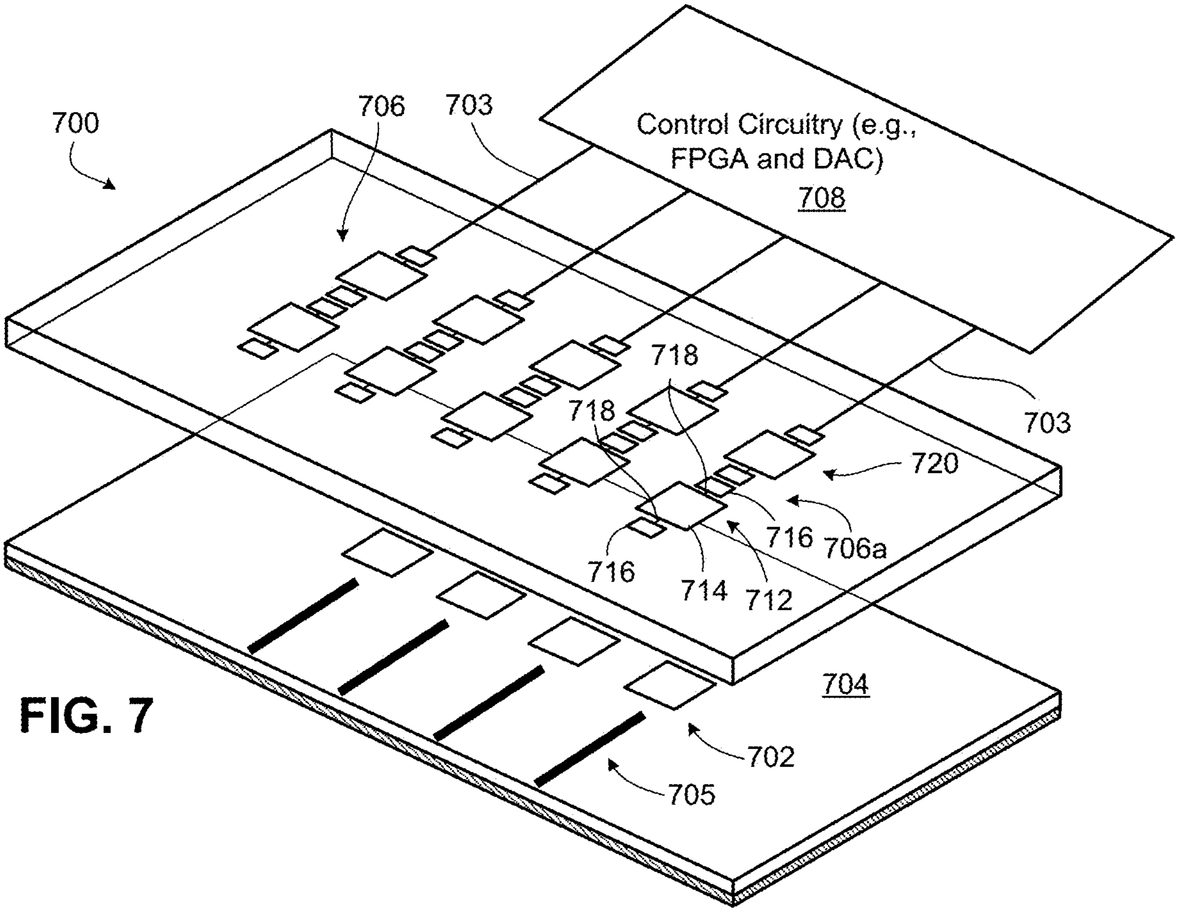
FIG. 7 is a diagram illustrating an example reconfigurable antenna system.

FIG. 7 shows an example reconfigurable antenna system 700, e.g., a similar system to antenna systems 200, 300, and 400. For example, in some implementations, antennas 702 are substantially identical to antennas 401, 302, and 202. In some implementations, controllable components 706 are substantially identical (except in their particular layout/morphology) to controllable components 404 and 308.

The system 700 includes a 4x1 array of antennas 702, disposed on or in a first substrate 704. The antennas 702 are driven by respective transmission lines 705 (e.g., RF transmission lines), which are sometimes referred to as "drive inputs" because input signals to drive the antennas 702 are provided through the transmission lines 705. A driving circuit (not shown) provides drive signals to the antennas 702; the drive signals can have phase differences between them or can be of a common phase. Above the antennas 702, e.g., disposed on or in a second substrate or in a higher layer of the first substrate 704, controllable components 706 are electrically coupled to control circuitry 708, e.g., the control circuitry 601. Each controllable component 706 includes two sets of three portions of metal, where a middle metal portion of each set is larger than the other two portions of the set and is controllably coupled to the other two portions by adjustable coupling devices such as varactors. For example, controllable component 706*a* includes a first set of metal portions 712 that includes a large inner metal portion 714 and two outer metal portions 716 coupled to the inner metal portion 714 by varactors 718. This first set of metal portions 712 is arranged adjacent to a second, identical set of metal portions 720. The geometry of the two sets of metal portions 712, 720 and the respective configurations of each of their included varactors dictates a space-wave phase shift caused by the controllable component 706*a*.

Various physical arrangements of the antennas 702, the controllable components 706, and the control circuitry 708 are within the scope of this disclosure. For example, in some implementations, the control circuitry 708 is partially or wholly on or in a substrate (e.g., the first substrate 704) on or in which the antennas 702 and/or the controllable components 706 are provided, e.g., formed as integrated circuitry on the substrate. When the control circuitry 708 is on a same substrate as the controllable components 706, in some implementations the control circuitry 708 is coupled to the controllable components by interconnects (e.g., metal traces and/or inter-layer connections) on or in the same substrate. When the control circuitry 708 is not on a same substrate as the controllable components 706, various combinations of coupling components, such as cables, mezzanine connectors, and/or other electrical and/or optical signal-carrying media can be used for provision of the appropriate voltages (or other control signals, such as currents) to the controllable components.

The controllable components need not be arranged in a plane above a plane in which the antennas are arranged. Rather, in some implementations the controllable components are at least partially arranged laterally with respect to (e.g., in a same plane as) the antennas. For example, each controllable component can be positioned laterally with respect to one or more antennas and within a near-field distance of the one or more antennas, on or in one substrate. The near-field distance causes coupling, phase-shifting, and re-radiation even without vertical spacing between the antennas and the controllable components.

Figure 8A:
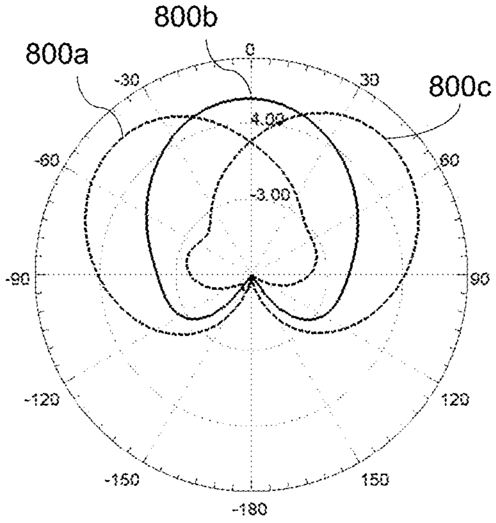
FIGS. 8A-8B are plots illustrating example beam profiles from two devices.
Figure 8B:
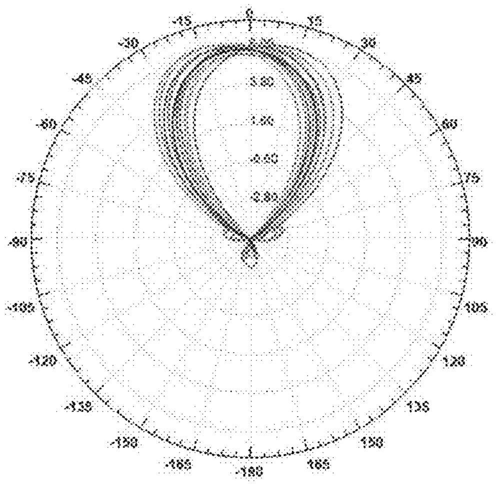

FIGS. 8A-8B show simulated beam amplitudes, as a function of angle, for two devices. In FIG. 8A, the corresponding device incorporates phase shifters with adjustable p-i-n diodes each switchable between two states. While output beams can be switched between three states 800*a*, 800*b*, 800*c* in three respective target directions by a combination of appropriate configuration of the p-i-n diodes and appropriate configuration of guided-wave phase shifters that feed the antennas of the device, intermediate states (e.g., with target directions between the target directions of states 800*a*, 800*b*, 800*c*) are not accessible. By contrast, in FIG. 8B, the corresponding device incorporates a space-wave phase-shifting element with quasi-continuously-adjustable coupling devices, such as varactors, and also includes control circuitry that is configured to control the coupling devices to cause adjustment of beam direction predominantly or wholly by space-wave phase-shifting by the space-wave phase-shifting element. Therefore, the device of FIG. 8B is able to steer beams quasi-continuously with small step sizes and between many different directions, limited by control stability of different configurations of the varactors.

Figure 9:
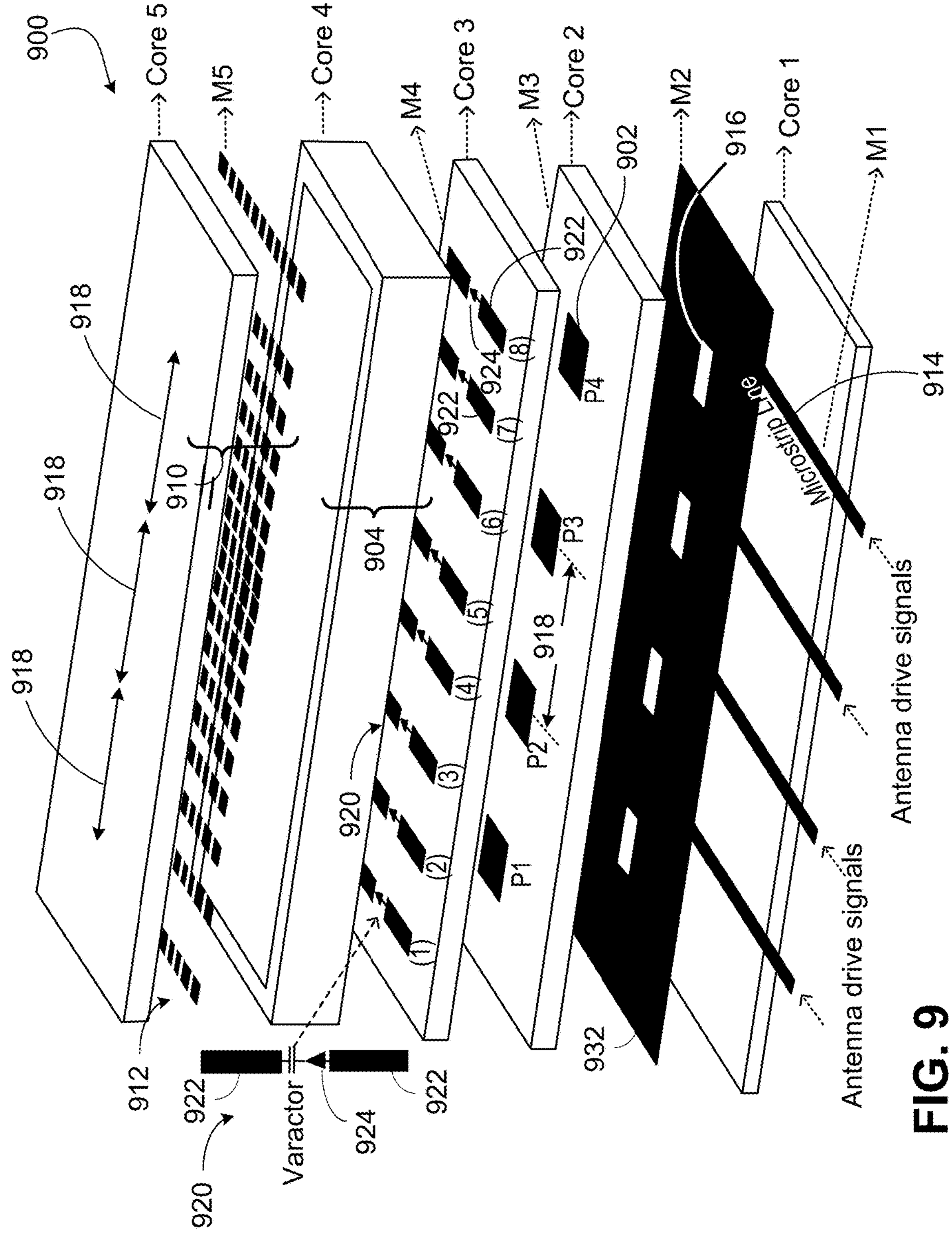
FIG. 9 is a three-dimensional exploded view of an example reconfigurable antenna system.
Figure 10:
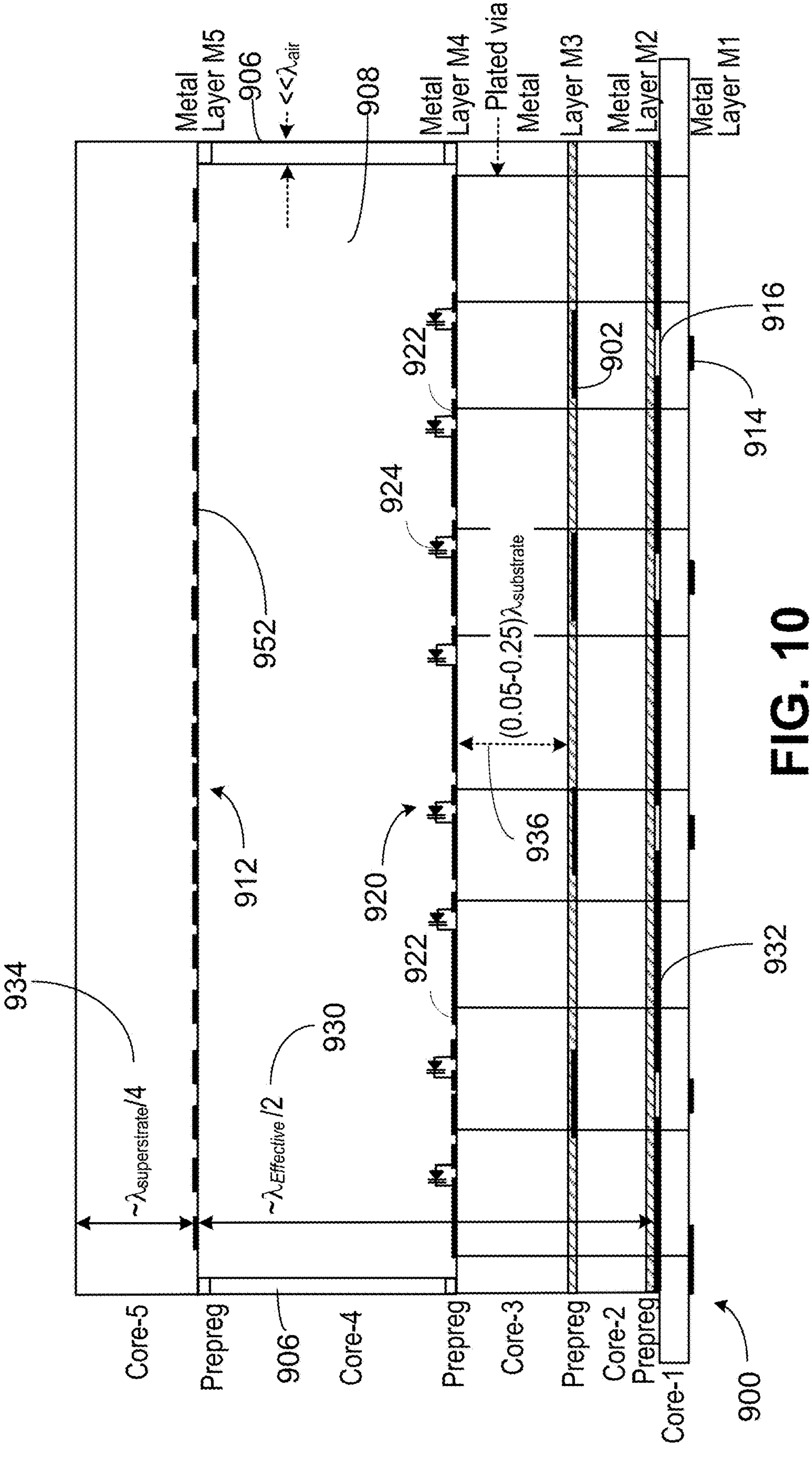
FIG. 10 is a cross-sectional view of an example reconfigurable antenna system.

As noted above, controllable components need not be disposed with vertical spacing respect to antennas. However, some implementations are arranged in this manner. In addition, some implementations include a "superstrate" that is arranged to create a gain-enhancing cavity. FIGS. 9-10 show an example PCB-integrated reconfigurable antenna system 900, e.g., similar to antenna systems 200, 300, 400, and 700. For example, in some implementations the controllable components 302, 404, and 706 are implemented as shown in FIGS. 9-10. In some implementations, antennas 202, 302, 401, and 702 are implemented as shown in FIGS. 9-10, e.g., driven by feed lines (transmission lines) that couple to the antennas through slits (such as slits in a ground plane). In some implementations, some or all of the overall structure shown in FIGS. 9-10 (including some or all of the described substrate layers, spacings, and component arrangements) can be implemented in the antenna systems 200, 300, 400, and 700.

Antenna system 900 includes antennas 902 (e.g., four antennas 902), an optional mechanical support layer 904 having solid side spacers 906 enclosing a cavity 908 (e.g., an air cavity or a cavity filled with a material having refractive index greater than 1), and an optional superstrate 910 of which a surface (e.g., a bottom surface) houses a partially reflective surface (PRS) 912. Layers identified with the letter "M" represents metallic layers (e.g., copper), and layers represented by the word "Core" represents a substrate material, e.g., one or more epoxy laminates, in some implementations coated with a metal such as copper. "Prepreg" layers are similar to core layers and serve as binding layers; in some implementations, prepreg layers include uncured resin encasing a glass weave, while the core layers are cured. In this example, the antennas 902 are aperture-coupled patch antennas. The bottom surface of core-1 (indicated as M1 in FIGS. 9-10) contains microstrip feed lines 914 (transmission lines) which couple electromagnetic energy from an antenna driver circuit (not shown) to the antennas 902 placed on the M3 layer (top surface of core 2) via slits 916 in an M2 ground layer. In some implementations, a distance (spacing) 918 between adjacent antennas 902 is greater than a wavelength of the antenna-emitted radiation in air ($>\lambda_{air}$). In this example, controllable components 920 include two portions of metal 922 coupled by an adjustable coupling device 924 (e.g., a varactor), and the controllable components 920 are disposed on a top surface of core-3 (indicated as M4 in FIGS. 9-10). Also, in this example, plated via metal (an example of which is indicated in FIG. 10) forms at least some inter-layer interconnections, such as control lines to the controllable components 920 (e.g., control lines 612).

A direction of a magnitude peak of a radiation pattern output by the antenna system 900 is determined, on a granular level, by phase-shifting by each controllable component 920 on radiation output by antennas 902 within a near-field distance of the controllable component 920 (control lines to the controllable components 920 are not shown but can be included, for example, as part of layer M4). For example, in FIG. 9, controllable components 920 (1) and (2) phase-shift radiation emitted by the first antenna 902 on the left, and controllable components 920 (7) and (8) phase-shift radiation emitted by the fourth antenna 902 on the right. As noted above, in some implementations at least one antenna has its emitted radiation phase-shifted by at least two controllable components. In some implementations, at least one controllable component phase-shifts radiation from at least two antennas. In some implementations, at least one antenna emits radiation that is not space-wave phase-shifted by a controllable component.

Figure 11:
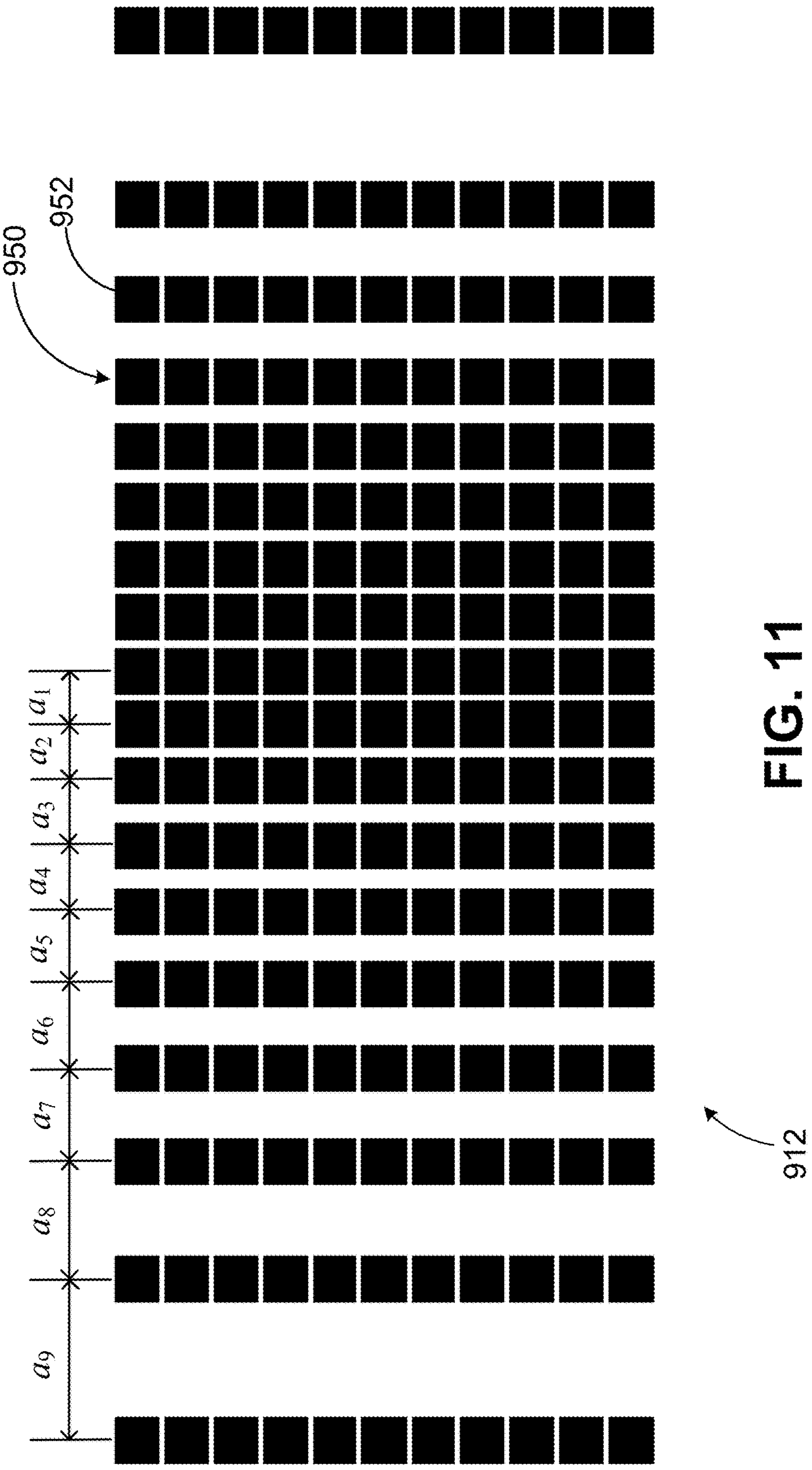
FIG. 11 is a top view of a partially reflective surface.

In this implementation, the PRS 912 reduces side lobes of emitted radiation (lobes in directions besides the target direction) by creating a passive tapered current distribution. As shown in FIG. 11, the PRS 912 includes rows 950 of features 952. In some implementations, the rows are spaced apart by inter-element distances a, and/or the left and right sides of the PRS 912, including the inter-element distances, $\alpha_1<\alpha_2< \ldots <\alpha_9$, are symmetric.

The superstrate 910 is suspended above (e.g., spaced apart from) core-3 (e.g., spaced apart from the controllable components 920) using a four-sided spacer 906 enclosing the cavity 908. In some implementations, the spacer 906 has a thickness that is much less than a wavelength of the antenna-emitted radiation in air ($\ll\lambda_{air}$), e.g., less than ten times the wavelength. This structure forms a leaky wave/Fabry Perot-type antenna which enhances the gains of radiation phase-shifted by each controllable component 920 and hence the gain of the total antenna system 900. In some implementations, the spacing 930 between a ground plane 932 defining the slits 916 and the superstrate 910 is selected to be close to a half wavelength of the emitted radiation in the effective medium formed in-between the ground plane 932 and the superstrate 910. In some implementations, the thickness 934 of the superstrate 910 is close to a quarter wavelength of the emitted radiation in the superstrate 910. In some implementations, a distance 936 between a plane of the antennas 902 and a plane of the controllable components 920 is between 0.05 and 0.25 times a wavelength of the emitted radiation in the substrate (e.g., in the core material of the PCB having the controllable components 920 and the antennas 902); this distance 936 can be other lengths in various implementations (e.g., less than a near-field distance).

Figure 12:
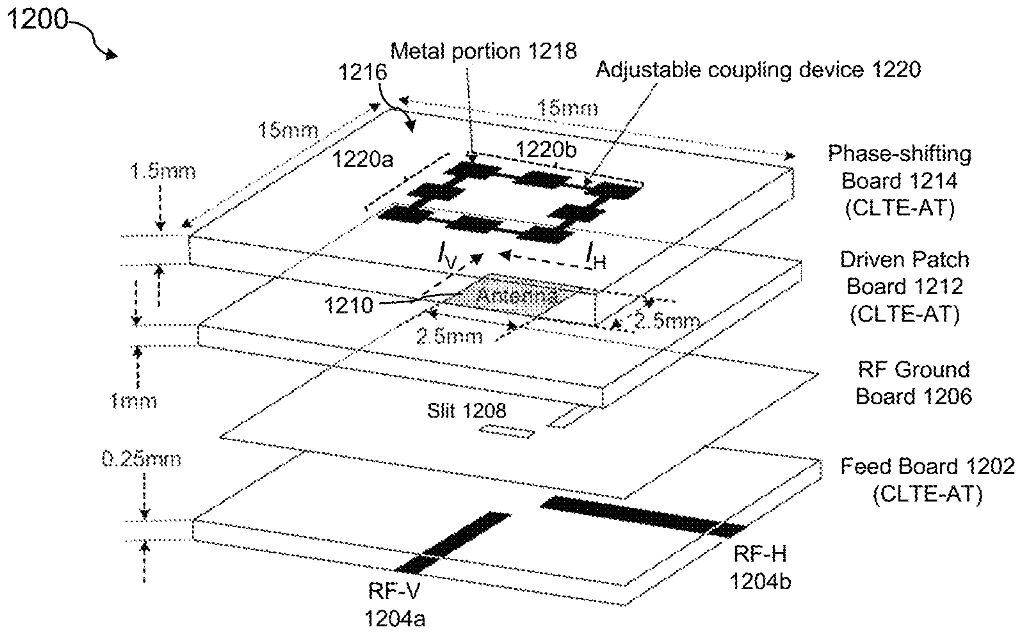
FIGS. 12-14 are three-dimensional exploded views of example reconfigurable antenna systems.
Figure 13:
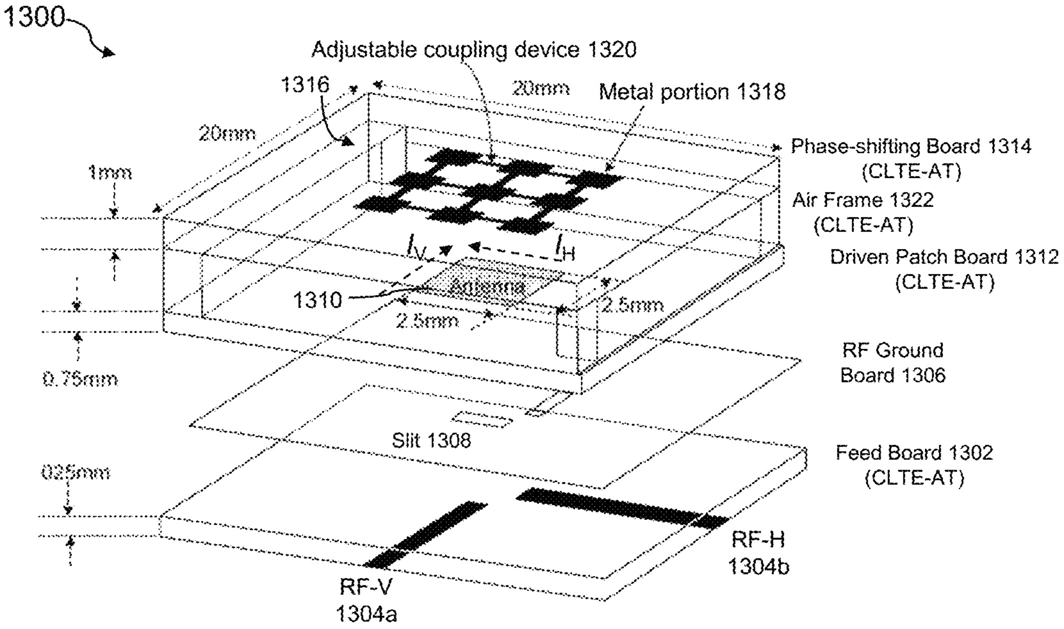
Figure 14:
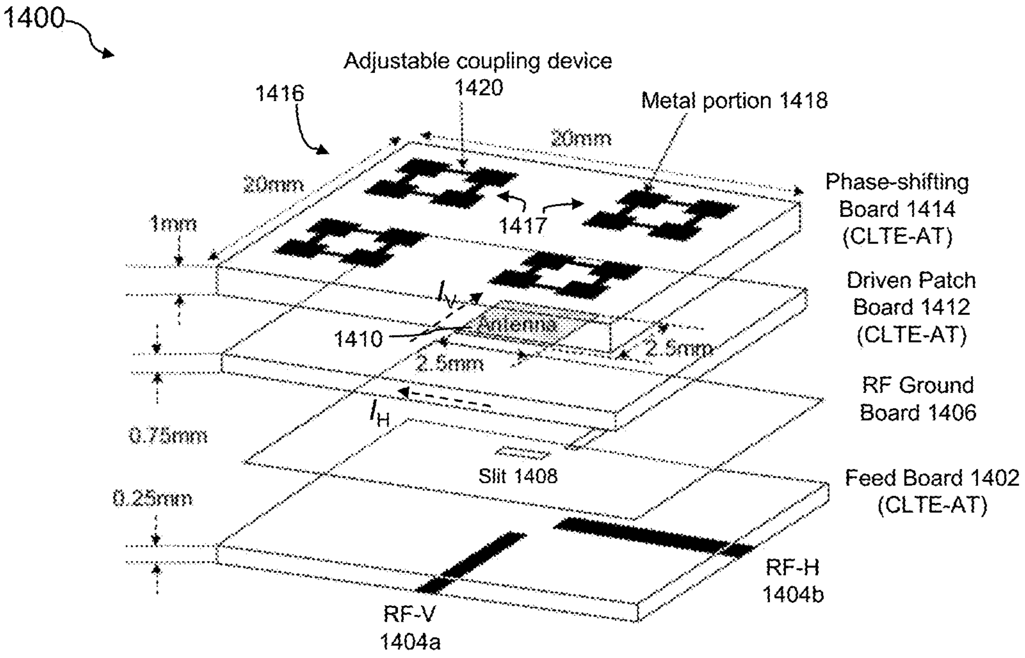

In some implementations, beam emission includes emission of orthogonally-polarized radiation. FIGS. 12, 13, and 14 illustrate respective dual-polarized reconfigurable array systems 1200, 1300, 1400. Each array system 1200, 1300, 1400 includes four or more board layers. A feed board 1202, 1302, 1402 includes pairs of microstrip transmission lines 1204*a*/1204*b*, 1304*a*/1304*b*, 1404*a*/1404*b* that are perpendicularly oriented with respect to one another. The transmission lines 1204*a*, 1304*a*, 1404*a* excite vertically-polarized RF fields, and the transmission lines 1204*b*, 1304*b*, 1404*b* excite horizontally-polarized RF fields. The perpendicularly-polarized fields correspondingly induce perpendicular currents in directions $I_V$ and $I_H$.

An RF ground board 1206, 1306, 1406, defines slits 1208, 1308, 1408 that couple electromagnetic energy from the feed board 1202, 1302, 1402 to an antenna 1210, 1310, 1410 on a driven patch board 1212, 1312, 1412. The driven antenna 1210, 1310, 1410 emits radiation that is space-wave phase-shifted by controllable components on a phase-shifting board 1214, 1314, 1414.

In the examples of FIGS. 12-14, the controllable components are arranged and configured so as to space-wave phase-shift radiation in both of the polarization directions. As shown in FIG. 12, the controllable component 1216 is a square ring-shaped reconfigurable arrangement of portions of metal 1218 linked by adjustable coupling devices 1220. The controllable component 1216 includes portions 1220*a*, 1220*b* extending in both directions $I_V$ and $I_H$, respectively (perpendicular to one another), that can be controlled substantially independently from one another to phase-shift primarily vertically and horizontally polarized electromagnetic waves, respectively. This arrangement can allow for independent orthogonal beam steering operation of vertical and horizontal polarizations, which can provide, in some implementations, effective doubling of wireless communication capacity because simultaneous transmission of both polarizations can be performed and adjusted. For example, a first phase shift can be applied to the vertically-polarized electromagnetic waves, and a second phase shift can be applied to the horizontally-polarized electromagnetic waves, where the two phase shifts are controlled/selected independently and need not be the same or change with one another.

As shown in FIG. 13, the controllable component 1316 is a 3×3 grid of metal portions 1318 with nearest-neighbors coupled by adjustable coupling devices 1320. As described in reference to FIG. 12, the controllable component 1316 can be understood as including independently-controllable portions (corresponding to columns and rows of the grid, respectively) that can be controlled to separately phase-shift vertically and horizontally polarized electromagnetic waves, e.g., to increase wireless transmission capacity.

As shown in FIG. 14, the controllable component 1416 includes four spatially-separated (and electrically isolated) 2×2 grids 1417 of metal portions 1418 with adjacent metal portions coupled by adjustable coupling devices 1420. Within each grid 1417, respective vertically and horizontally aligned sets of metal portions 1418 and adjustable coupling devices 1420 can be controlled to independently phase-shift vertically and horizontally polarized electromagnetic waves, as described in reference to FIG. 12.

In the reconfigurable array systems 1200, 1300, 1400, the ground boards 1206, 1306, 1406 include metallic ground planes that define the slits 1208, 1308, 1408. The boards of each system 1200, 1300, 1400 are shown as being formed of CLTE-AT, a laminate, but can in other implementations be formed of other or additional materials/board configurations, such as RO4835 or RO3006. The boards, in various implementations, can be separate spaced-apart circuit boards/substrates and/or can represent layers of one or more circuit boards/substrates. In some implementations, an air frame spatially separates boards with air in-between, as shown for air frame 1322 in FIG. 13.

A wide variety of other configurations, shapes, sizes, materials, numbers, and other characteristics of the antenna, metal portions of the controllable component, inter-portion coupling of the controllable component, adjustable coupling devices, boards, driving transmission lines, and other elements can instead or additionally be used.

Figure 15A:
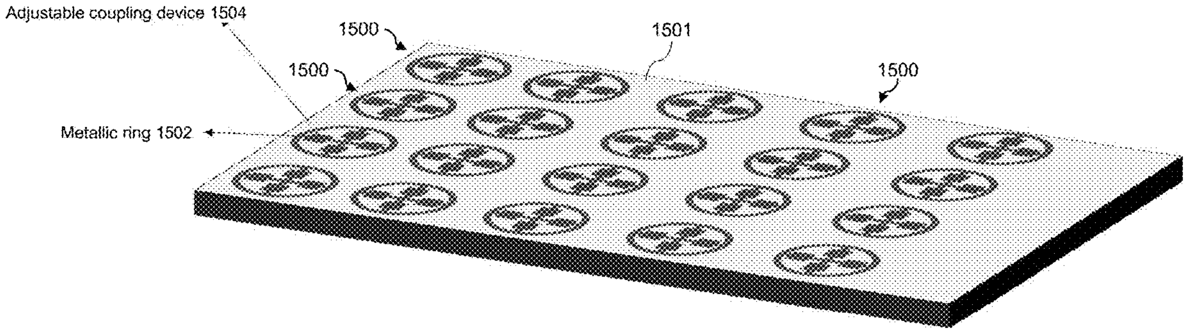
FIGS. 15A-15C are diagrams illustrating example controllable component arrays.
Figure 15B:
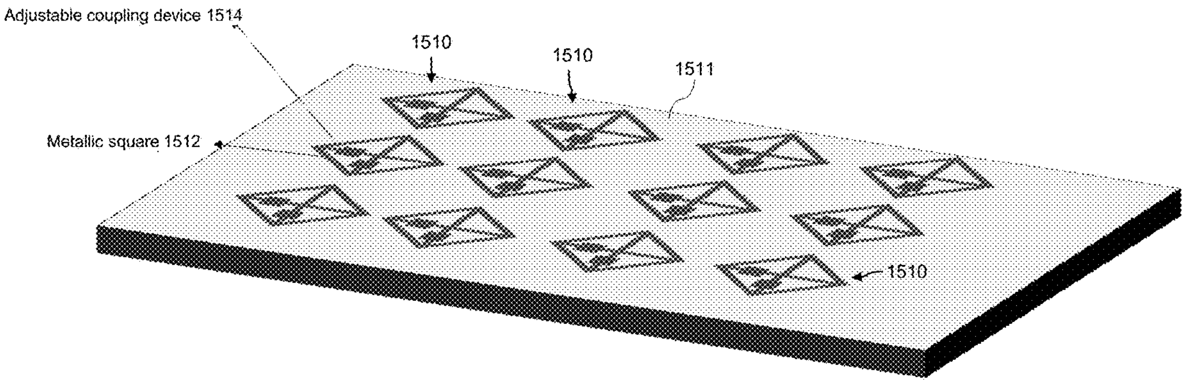
Figure 15C:
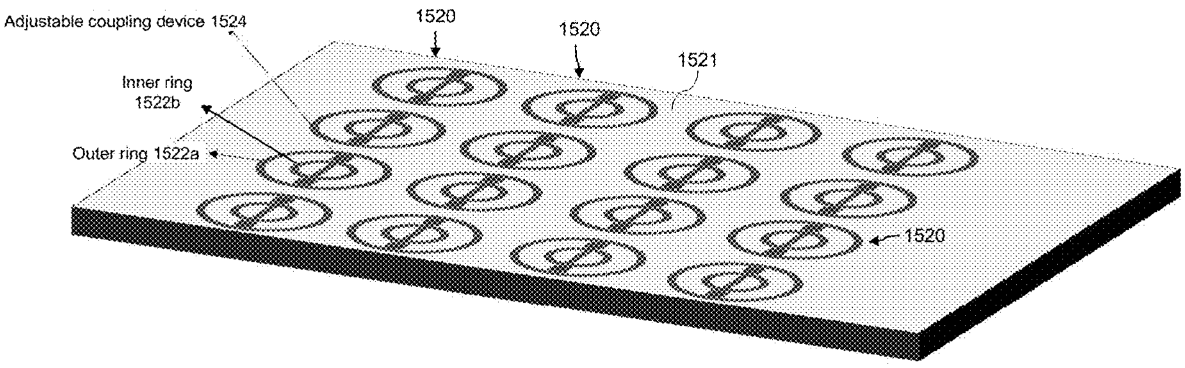

FIGS. 15A-15C show additional examples of controllable component geometry, in which controllable components are arranged in grids on phase-shifting boards 1501, 1511, 1521. As shown in FIG. 15A, each controllable component 1500 includes a metallic ring 1502 (a metal portion) connected along two perpendicular diameters by pairs of adjustable coupling devices 1504 joined by a further metal portion. In FIG. 15B, each controllable component 1510 includes a metallic square 1512 (a metal portion) connected in two perpendicular directions between opposite corners by metal portions that include adjustable coupling devices 1514. In FIG. 15C, each controllable component 1520 includes two concentric metallic rings 1522*a*, 1522*b* (metal portions) connected along a diameter of the larger ring 1522*a* by adjustable coupling devices 1524 between the rings 1522*a*, 1522*b*. These and other complex arrangements (geometries of each controllable component, a number of controllable components, etc.) can be optimized using full-wave electromagnetic solvers. The electromagnetic solvers can be used to determine phase shifts, transmission coefficients, and reflection coefficients for each controllable component and/or for arrays of controllable components as shown in FIGS. 15A-15C.

Figure 16:
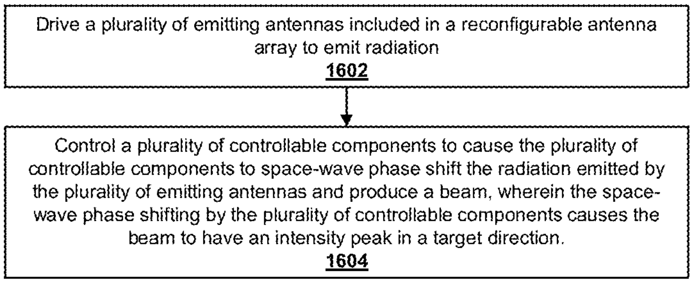
FIG. 16 is a diagram illustrating an example beam-steering process.

FIG. 16 shows an example process 1600 in accordance with this disclosure. In the process 1600, a plurality of emitting antennas included in a reconfigurable antenna array are driven to emit radiation (1602). For example, transmission lines are driven, the transmission lines coupling to the emitting antennas (e.g., directly or through slits in a ground plane as shown in FIGS. 9 and 12-14). A plurality of controllable components are controlled to cause the plurality of controllable components to space-wave phase shift the radiation emitted by the plurality of emitting antennas (1604). The space-wave phase shifting by the plurality of controllable components causes the beam to have an intensity peak in a target direction. For example, voltages are applied to one or more varactors of each controllable component, adjusting an impedance of the controllable component and, correspondingly, a phase shift applied by the controllable component, as described throughout this disclosure.

Although this disclosure has described beam-steering systems by reference to various implementations, descriptions of components in each implementation can be applied to components in other implementations unless described otherwise. For example, the descriptions of controllable components, adjustable coupling devices, control circuitry, boards/substrates, antennas, control operations, and physical arrangements/layouts of these components in relation to one another, that are provided in reference to any one or more of FIGS. 1-16 or otherwise provided, can be applied to components referred to using the same term in reference to other figures and/or otherwise referred to elsewhere in this disclosure, unless explicitly described otherwise.

Other implementations are also within the scope of the following claims.

For example, although this disclosure sometimes refers to examples of controlling controllable components to produce output radiation having an intensity peak in a single target direction, in some implementations, in some implementations the controllable components are controlled to produce output radiation having two or more intensity peaks in two or more target directions. For example, separate groups of controllable components can be controlled to simultaneously cause respective intensity peaks in respective directions. The flexibility provided by quasi-continuous control of the adjustable coupling devices can be exploited with appropriate configuration of controlling computer systems for this and other non-trivial beam-steering results.

As another example, although this disclosure sometimes refers to varactors as being the adjustable coupling devices, other devices can instead or additionally be used, such as any circuit element or combination of circuit elements with a reactance that is continuously adjustable by appropriate provision of voltages and/or currents. For example, in some implementations the adjustable coupling device includes an integrated circuit of two or more components, the integrated circuit as a whole having a continuously adjustable imaginary part of impedance. In some implementations, a device besides a varactor is used, such as a device exhibiting hysteric and/or voltage-dependent variable reactance, e.g., a ferroelectric variable capacitor.

Various implementations of the systems and techniques described here, such as control systems (e.g., control circuitry, sometimes referred to as an FPGA and/or microcontroller) that determine control signals (e.g., voltages) to be applied to controllable components for a desired result (e.g., a beam steered in a target direction), and that provide the control signals, can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable processing system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to one or more programmable processors, including a machine-readable medium that receives machine instructions.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by the data processing apparatus, cause the apparatus to perform the operations or actions.

Although a few implementations have been described in detail above, other modifications are possible. Logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. An apparatus comprising:

a reconfigurable antenna array comprising a plurality of emitting antennas, a plurality of drive inputs corresponding to respective emitting antennas of the plurality of emitting antennas and configured to receive drive signals for the respective emitting antennas, a plurality of controllable components that are controllable to perform space-wave phase shifting on radiation emitted by the plurality of emitting antennas, and a plurality of control inputs corresponding to the plurality of controllable components, the plurality of control inputs arranged to receive control signals for the plurality of controllable components; and control circuitry having outputs coupled to the plurality of drive inputs and the plurality of control inputs, the control circuitry configured to drive the plurality of emitting antennas to generate the radiation, deliver the control signals to the plurality of controllable components to cause the plurality of controllable components to space-wave phase shift the radiation emitted by the plurality of emitting antennas, the space-wave phase shifting by the plurality of controllable components causing the reconfigurable antenna array to emit a beam having an intensity peak in a target direction.

2. The apparatus of claim 1, wherein the control circuitry is configured to deliver the control signals to the plurality of controllable components to steer the beam between at least ten target directions.

3. The apparatus of claim 2, wherein at least two of the at least ten target directions are less than two degrees apart from one another.

4. The apparatus of claim 1, wherein at least one antenna of the plurality of emitting antennas is not coupled to a guided-wave phase shifter.

5. The apparatus of claim 1, wherein radiation emitted by at least one antenna of the plurality of emitting antennas is not space-wave phased shifted by the plurality of controllable components.

6. The apparatus of claim 1, wherein a first controllable component of the plurality of controllable components comprises an adjustable coupling device.

7. The apparatus of claim 6, wherein the adjustable coupling device comprises a varactor.

8. The apparatus of claim 6, wherein the control circuitry is configured to adjust the adjustable coupling device between at least five different settings.

9. The apparatus of claim 8, wherein each setting of the at least five different settings corresponds to a different respective impedance of the adjustable coupling device.

10. The apparatus of claim 6, wherein the adjustable coupling device is continuously adjustable.

11. The apparatus of claim 6, wherein the adjustable coupling device couples two portions of metal in the first controllable component.

12. The apparatus of claim 1, wherein the plurality of controllable components have controllable impedances.

13. The apparatus of claim 1, wherein the radiation emitted by the plurality of emitting antennas, prior to space-wave phase shifting, has a common phase across the plurality of emitting antennas.

14. The apparatus of claim 1, wherein a first controllable component of the plurality of controllable components comprises an array of metal portions in which nearest- neighbors are coupled by adjustable coupling devices.

15. The apparatus of claim 1, comprising a superstrate spaced apart from a substrate on which or in which the plurality of controllable components are disposed, the superstrate including a partially reflective surface.

16. The apparatus of claim 1, wherein the plurality of controllable components are arranged in a first common plane spaced apart from a second common plane in which the plurality of emitting antennas are arranged.

17. The apparatus of claim 16, wherein the first common plane and the second common plane are separated by at least one of air or a substrate material.

18. The apparatus of claim 1, wherein a first controllable component of the plurality of controllable components comprises:

a first portion configured to phase shift vertically-polarized electromagnetic waves, and a second portion arranged orthogonally to the first portion and configured to phase shift horizontally-polarized electromagnetic waves.

* * * * *